US008226863B2

(12) United States Patent
Kusuura

(10) Patent No.: US 8,226,863 B2
(45) Date of Patent: Jul. 24, 2012

(54) METHOD FOR PRODUCING THREE-DIMENSIONAL PRODUCT HAVING NANOPOROUS SURFACE

(75) Inventor: Takahisa Kusuura, Kawasaki (JP)

(73) Assignee: Empire Technology Development LLC, Wilmington, DE (US)

( * ) Notice: Subject to any disclaimer, the term of this patent is extended or adjusted under 35 U.S.C. 154(b) by 198 days.

(21) Appl. No.: 12/639,836

(22) Filed: Dec. 16, 2009

(65) Prior Publication Data

US 2010/0190403 A1 Jul. 29, 2010

(30) Foreign Application Priority Data

Jan. 26, 2009 (JP) ................................. 2009-014258

(51) Int. Cl.
B29C 44/04 (2006.01)
B29C 67/00 (2006.01)
B29C 67/20 (2006.01)

(52) U.S. Cl. ........ 264/49; 264/45.1; 264/46.9; 977/773; 977/778; 977/780; 977/781; 977/840

(58) Field of Classification Search .................... None
See application file for complete search history.

(56) References Cited

U.S. PATENT DOCUMENTS

| 4,892,544 | A  * | 1/1990  | Frisch ............................ 128/898 |
| 5,746,916 | A  * | 5/1998  | Kamo et al. .............. 210/500.23 |
| 7,374,903 | B2   | 5/2008  | Cousins et al. |
| 2006/0140916 | A1 | 6/2006 | Siani-Rose et al. |
| 2006/0171930 | A1 | 8/2006 | Seyda et al. |
| 2007/0082190 | A1 * | 4/2007 | Endres et al. .............. 428/312.2 |
| 2008/0065228 | A1 * | 3/2008 | Kim ............................ 623/23.61 |
| 2009/0246872 | A1 | 10/2009 | Ozawa et al. |
| 2009/0317482 | A1 | 12/2009 | Siani-Rose et al. |
| 2010/0189756 | A1 * | 7/2010 | Kusuura ......................... 424/409 |
| 2010/0189992 | A1 * | 7/2010 | Kusuura ....................... 428/315.5 |
| 2011/0189761 | A1 * | 8/2011 | Kusuura ....................... 435/283.1 |

FOREIGN PATENT DOCUMENTS

| EP | 1988152 | 11/2008 |
| JP | 2899903 | 9/1991 |
| JP | 11-200090 | 7/1999 |
| JP | 2000-008273 | 1/2000 |
| JP | 2001-157574 | 6/2001 |
| JP | 2006-179880 | 7/2006 |
| JP | 2007-217331 | 8/2007 |
| JP | 2008-069125 | 3/2008 |
| JP | 2008-121043 | 5/2008 |
| JP | 2008-520748 | 6/2008 |
| JP | 2008-523957 | 7/2008 |
| JP | 4159103 | 7/2008 |
| WO | WO 2006/055981 | 5/2006 |
| WO | WO 2006/068972 | 6/2006 |

OTHER PUBLICATIONS

ASTM E 2456-06 Terminology for Nanotechnology, Nov. 2006.*
Notice of Reasons for Rejection for JP 2009-014258 mailed Jun. 9, 2009 (with English translation).
Notice of Reasons for Rejection for JP 2009-014258 mailed Sep. 28, 2009 (with English translation).
Decision of Rejection for JP 2009-014258 mailed Mar. 30, 2010 (with English translation).

* cited by examiner

*Primary Examiner* — Christina Johnson
*Assistant Examiner* — Benjamin Schiffman
(74) *Attorney, Agent, or Firm* — Foley & Lardner LLP

(57) ABSTRACT

The present invention provides a method for producing a three-dimensional product having a nanoporous surface in which the pore density, pore size or pore size distribution can be easily and readily controlled. The invention combines two techniques: a method for producing a three-dimensional product in which a yarn is knitted or woven to finish into an arbitrary three-dimensional shape, and a method for transforming a surface consisting of a material in which nanoparticles are dispersed in a matrix to a nanoporous surface by immersing the surface in a liquid which dissolves the nanoparticles but does not dissolve the matrix.

19 Claims, No Drawings

METHOD FOR PRODUCING THREE-DIMENSIONAL PRODUCT HAVING NANOPOROUS SURFACE

CROSS REFERENCE TO RELATED APPLICATION

This application claims the benefit of Japanese Application No. 2009-14258 filed on Jan. 26, 2009 which is incorporated herein by reference.

BACKGROUND OF THE INVENTION

1. Field of the Invention

This application relates to a three-dimensional product having a nanoporous surface and a method for producing the same.

2. Description of the Related Art

A product which has a nanoporous surface, that is, indentations of nanometer-level (specifically a pore size of 1000 nm or less) on the surface, has electrical, optical and chemical properties that are different from those of a smooth surface and attracts attention as a functional material in various fields.

In fields such as agriculture and regenerative medicine, it is proposed that a product having a nanoporous surface be utilized as a cell culture scaffolding material for study and medical use (a scaffolding material in culturing cells) (refer to Japanese Patent Laid-Open No. 2001-157574 and Japanese Patent No. 4159103).

As a method for producing a product having a nanoporous surface, a fine pattern processing technique using electron beam exposure and X-ray exposure is considered. In addition, as a method for using a naturally formed structure, there is well known a method of using a nanoporous alumina anode oxidized film formed when aluminum is anode-oxidized in an acidic electrolyte (refer to Japanese Patent Laid-Open No. 11-200090).

However, a fine pattern processing technique requires a complicated processing using an exposure apparatus such as an electron beam exposure apparatus and an X-ray exposure apparatus. A nanoimprint technique employed for forming a nanoporous surface in Japanese Patent No. 4159103 is used for transferring a mold having a concave-convex structure of nanometer order to a product to be processed and requires precise condition controls such as transferring of the mold in the transferring process. In addition, the preparation cost of the mold is high and a mold having a large area is difficult to produce. Especially, as the cell culture scaffolding material, there are demanded a product in a three-dimensional shape which imitates biological organs and tissues and the like, in addition to a product in a planar shape, and fine pattern processing or nanoprinting is difficult to perform for a product having such a complicated three-dimensional shape.

Further, in order to efficiently culture cells, it is desired to set the density (porosity), pore size, pore size distribution and the like of the fine indentations on the surface of the cell scaffolding material in an appropriate range depending on the kinds of cells to be cultured, but in the method disclosed in Japanese Patent Laid-Open No. 2001-157574 or in the method of using an alumina anode oxidized film, the porosity, pore size or pore size distribution of the indentations are difficult to control.

For this reason, there has been demanded a method for producing a three-dimensional product having a nanoporous surface in which the pore density, pore size or pore size distribution can be easily controlled in a desired range.

SUMMARY OF THE INVENTION

As a result of various studies on the method for producing a three-dimensional product, the present inventor has noticed that a product having a complicated three-dimensional shape can be easily produced by knitting or weaving a yarn into a three-dimensional shape. And, in this method, the present inventor has found that a three-dimensional product having a nanoporous surface can be easily obtained by making the surface of the yarn nanoporous.

In addition, as a result of earnest studies on a method for forming a nanoporous surface in order to produce a yarn having a nanoporous surface which has a desired pore size and pore size distribution, the present inventor has found that a material in which nanoparticles are dispersed in a matrix is prepared, and when the material is immersed in a liquid which dissolves the nanoparticles but does not dissolve the matrix, only the nanoparticles are eluted, as a result, indentations of nanometer-level are formed as elution trace of the nanoparticles on the surface of the material, and further, the density, pore size or pore size distribution of the indentations can be controlled by adjusting the amount, particle size and particle size distribution of the nanoparticles which are dispersed in the matrix in a desired range.

Based on the above findings, the present inventor has reached the idea that a three-dimensional product having a nanoporous surface which has a desired pore size and pore size distribution can be easily produced by a combination of two techniques: a method for producing a three-dimensional product with an arbitrary three-dimensional shape by knitting or weaving a yarn; and a method for transforming a surface of a material in which nanoparticles are dispersed in a matrix to a nanoporous surface by immersing the surface in a liquid which dissolves nanoparticles but does not dissolve a matrix.

DETAILED DESCRIPTION OF THE PREFERRED EMBODIMENTS

The present embodiments will be described below, but the present invention is not limited to these embodiments.

In the present embodiments, a knitted fabric or a woven fabric having a three-dimensional shape is produced by using a yarn having a nanoporous surface.

A yarn having a nanoporous surface can be produced by preliminarily producing a yarn having a surface comprised of a material in which a plurality of nanoparticles is dispersed in a matrix, and immersing the material in a liquid which dissolves the nanoparticles but does not dissolve the matrix to selectively elute only the nanoparticles, and thereby forming indentations having a pore size of nanometer-level, which are elution trace of the nanoparticles, on the surface of the material.

The process of selectively eluting the nanoparticles may be carried out before or after the yarn is knitted (woven) into a three-dimensional shape.

The material that will constitute the matrix may be selected according to the application of the three-dimensional product having a nanoporous surface. Examples of the material include a thermoplastic resin, a hardening resin, an elastomer and cellulose.

Specific examples of the thermoplastic resin include a polyester; a polyamide; a polyolefine; a polycarbonate; a polyimide; a polystyrene or styrene-based copolymer; and a fluorine-containing resin (a polymer obtained by polymerizing a monomer containing a fluorine atom in the molecule) such as a polytetrafluoroethylene (PTFE), a tetrafluoroethylene-perfluoroalkoxy-ethylene copolymer (PFA), a tetrafluoroethylene-hexafluoropropylene copolymer (FEP), a tetrafluoroethylene-ethylene copolymer (ETFE), a polychlorotrifluoroethylene (PCTEF), a chlorotrifluoroethylene-ethylene copolymer (ECTEF), a vinyliden polyfluoride and a vinyl polyfluoride. Specific examples of the hardening resin include an epoxy resin, a phenolic resin, an acrylic resin and an urethane resin. Specific examples of the elastomer include natural rubber, a styrene-butadiene copolymer and a hydrogenated product thereof.

In addition, when a three-dimensional product having a nanoporous surface is used as a cell scaffolding material, there may be used a biodegradable material, that is, a material which is absorbable in the living body or a material which is degradable in the living body as a material that will constitute the matrix. Specific examples of the biodegradable material include polylactic acids, polycaprolactones, polyglycolic acids, polybutylene carbonates, gelatin, chitin, collagen, chitosan, keratin, apatite, polyamino acids, hyaluronic acid and polysaccharides, although some thereof overlap the above.

The material that will constitute the nanoparticles is not limited, and any combination may be used as long as a liquid is available which dissolves the nanoparticles but does not dissolve the matrix. For example, in the case of using a thermoplastic resin, a hardening resin, an elastomer and the like as the matrix, there may be used metal particles such as Ag, Cu, Fe, Ni, Cr and Zn particles as the nanoparticles. In addition, in the case of using cellulose as the matrix, as the nanoparticles, there may be used particles comprised of a polymer material which is dissolved in an organic solvent.

The particle size and particle size distribution of the nanoparticles are not limited. Since the pore size of the indentation which is an elution trace of the nanoparticle is approximately equal to the particle size of the nanoparticle, the pore size and pore size distribution of the nanoporous surface can be controlled by adjusting the particle size and particle size distribution of the nanoparticles. For example, the average particle size of the nanoparticles may be adjusted to a visible light wavelength, specifically from 800 nm or less, from the viewpoint of the optical effect. In addition, the average particle size of the nanoparticles may be adjusted to, for example, from 1000 nm to 100 nm, from 100 nm to 10 nm or from 10 nm to 1 nm according to the application of the three-dimensional product having a nanoporous surface.

Further, the term "particle size" as used herein means a biaxial average diameter, that is, an average value of a short diameter and a long diameter when the particle is two-dimensionally observed by a transmission electron microscope (TEM). Here, the terms "short diameter" and "long diameter" mean a short side and a long side, respectively, of a rectangle with minimum area circumscribed to the particle. And, the average particle size means an average of the particle size of 100 particles randomly selected in the same visual field when the particle is two-dimensionally observed. In addition, the term "pore size" as used herein means a pore size measured by the mercury pressure method according to JIS R1655.

Further, the shape of the nanoparticles is similarly not limited, and there may be used nanoparticles having a desired shape as the shape of the indentation of the nanoporous surface, according to the application of the three-dimensional product having a nanoporous surface. The nanoparticles may be ones produced by any method.

In the material in which a plurality of nanoparticles is dispersed in a matrix, the content of the nanoparticles in the matrix is not limited and needs to be appropriately determined depending on the desired density of indentation. In order to elute the nanoparticles in an immersion solution, at least a part of the nanoparticles is required to be exposed from the matrix. From the viewpoint of the above, depending on the desired density of the indentation, the content of the nanoparticles may be 30% by volume or more, 50% by volume or more, 70% by volume or more, or 90% by volume or more, based on the total volume of the material constituting the nanoparticles and the matrix.

There is no limitation on a method for producing a yarn having a surface comprised of a material in which a plurality of nanoparticles is dispersed in a matrix. Examples of the method include a. coating a core yarn with a layer comprised of a material in which a plurality of nanoparticles is dispersed in a matrix, b. spinning a yarn comprised of a material in which a plurality of nanoparticles is dispersed in a matrix, and c. winding a fiber or a yarn comprised of a material in which a plurality of nanoparticles is dispersed in a matrix around the core yarn.

In addition, a hollow yarn may be produced by removing a core yarn by elution and the like from a yarn obtained by methods a. and c.

a. In the case of coating a core yarn with a layer comprised of a material in which a plurality of nanoparticles is dispersed in a matrix, the coating method is not particularly limited. In addition, there is no limitation on the thickness of the layer comprised of a material in which a plurality of nanoparticles is dispersed in a matrix, and for example, the thickness may be larger or smaller than the average particle size of the nanoparticles.

According to one embodiment, a nanoparticle dispersion solution containing a material that will constitute the matrix is prepared and the solution is applied around a core yarn, thereby making it possible to coat the core yarn with a layer comprised of a material in which a plurality of nanoparticles is dispersed in a matrix.

In the nanoparticle dispersion solution containing a material that will constitute the matrix, the material that will constitute the matrix may be dissolved or dispersed in the nanoparticle dispersion solution. Specific examples of the nanoparticle dispersion solution containing a material that will constitute the matrix include a liquid obtained by dispersing nanoparticles in a solution in which the material that will constitute the matrix is dissolved or a liquid obtained by dispersing both the particles comprised of the material that will constitute the matrix and the nanoparticles in a dispersion medium. For example, a nanoparticle dispersion solution may be prepared by dispersing nanoparticles in a solution which is prepared by dissolving a material that will constitute the matrix in water or in an organic solvent such as alcohols, a ketone-based solvent, an ester-based solvent, a hydrocarbon-based solvent, a halogen-based hydrocarbon-based solvent and various cellulose solvents, or may be prepared by dispersing nanoparticles in a dispersion solution which is prepared by dispersing particles comprised of a material that will constitute the matrix in a dispersion medium such as water, or may be prepared by dispersing particles consisting of a material that will constitute the matrix in a dispersion solution which is prepared by dispersing nanoparticles in a dispersion medium.

The dispersibility of the nanoparticles in a dispersion solution may be improved by subjecting to surface modification such that the elution of the nanoparticles in the later process is not prevented. An example of the nanoparticles which are subjected to surface modification includes, for example, nanoparticles in which the surface is coated with a protein, a peptide or a vinylpyrrolidone polymer having a low molecular weight.

The surface modification in which a protein or a peptide is immobilized on the surface of nanoparticles can be performed according to the method disclosed in Japanese Patent Laid-Open No. 2007-217331. Specifically, a dispersion solution is prepared by dispersing nanoparticles in water using a surfactant and to the dispersion solution is added a protein or a peptide. Thereafter, an ultrasonic wave is applied to the resulting solution at a pH of 5.0 or higher to replace the surfactant on the surface of the nanoparticles with a protein or a peptide, thereby providing a water dispersion solution of nanoparticles in which a protein or a peptide is immobilized on the surface. For example, a nanoparticle dispersion solution containing a material that will constitute the matrix can be prepared by further dispersing particles comprised of a material that will constitute the matrix in the water dispersion of nanoparticles thus obtained.

In addition, a surface modification, in which nanoparticles are coated with a vinylpyrrolidone polymer having a low molecular weight, can be performed according to the method disclosed in Japanese Patent Laid-Open No. 2008-121043. Specifically, metal nanoparticles are prepared in the presence of a vinylpyrrolidone polymer having a low molecular weight, thereby obtaining metal nanoparticles coated with a vinylpyrrolidone polymer having a low molecular weight. The metal nanoparticles thus obtained, which are coated with a vinylpyrrolidone polymer having a low molecular weight, are dispersed, for example, in an organic solvent such as 1,2-ethanediol. Further, a material that will constitute the matrix is dissolved or particles comprised of a material that will constitute the matrix are dispersed in the metal nanoparticle solution thus obtained, thereby a nanoparticle dispersion solution containing a material that will constitute the matrix can be obtained.

The width and material of the core yarn are not limited, and an appropriate one may be selected depending on the application. The width of the core yarn may be, for example, from 20 μm to 2 mm. Examples of the material of the yarn include, for example, a polymer material which is the same or different from the material that will constitute the matrix; and a metal such as stainless steel.

There is no limitation on the method for applying the nanoparticle dispersion solution around the core yarn, and a conventionally known method may be employed, for example, a spraying method and a dip coating method.

After the coating, a dispersion medium solvent is removed from a coated layer by drying and the like, and there is formed a layer comprised of a material in which a plurality of nanoparticles is dispersed in a matrix. The coated layer may be heated and the material constituting the matrix may be sintered or melted to convert into a strong continuous phase, when needed. When the material constituting the matrix is a polymer material, the coated layer may be heated at or above the glass transition temperature of the polymer material.

According to another embodiment, so-called mechanical alloying can be used. The term "mechanical alloying" is a solid mixing method in which two or more solids are mixed while applying a large energy to cause repeated lamination, folding and rolling of the solid layers together and then the solids are finely mixed. Theoretically, the solids can be mixed at an atom level. According to mechanical alloying, nanoparticles can be relatively easily and uniformly dispersed in the matrix.

Generally, mechanical alloying is a method used when metals are mixed together. The present inventor has found that mechanical alloying can also be applied to the mixing of polymer materials together or a polymer material and a metal or the like if these materials can be folded and rolled together.

Specifically, there are prepared particles (powders) comprised of a material that will constitute the matrix and particles (powders) comprised of a material that will constitute the nanoparticles, and these particles are mixed while applying a large energy.

Then, a solid mixture obtained by mechanical alloying is melted and applied around a core yarn, or a dispersion solution, which is obtained by dissolving the solid mixture in a suitable solvent, is applied around the core yarn, thereby coating the core yarn with a layer comprised of a material in which a plurality of nanoparticles is dispersed in a matrix. As the coating method of the dispersion solution, the above-described methods can be employed. In addition, after the coating, the coated layer may be heated and the material constituting a matrix may be sintered or melted to convert into a strong continuous phase, when needed.

According to mechanical alloying, since solid materials are going to be folded and divided in the course of mixing, there can be formed a material in which nanoparticles are dispersed in a matrix even if particles of nanometer-level size are not prepared from the beginning. Therefore, the particle size of the particles (powders) comprised of a material that will constitute the nanoparticles prepared in performing mechanical alloying is not required to be nanometer-level, for example, may be from 1 to 1000 μm or may be from 1 to 100 μm. There is no limitation on the particle size of the particles (powders) comprised of a material that will constitute the matrix, and the particle size may be approximately equal to the that of the particles (powders) comprised of a material that will constitute the nanoparticles, or may be larger than the particles (powders) comprised of a material that will constitute the nanoparticles.

Mechanical alloying can be carried out by using the same method and apparatus as those used in the conventional method for mixing metals together. For example, mechanical alloying can be carried out by mixing using a ball mill such as a rolling ball mill, a vibration mill and a planetary ball mill. In this case, two or more kinds of solid particles are folded and rolled by the collision energy of the balls.

b. In the case of spinning a yarn comprised of a material in which a plurality of nanoparticles is dispersed in a matrix, the spinning method is not limited, for example, there may be employed a conventionally known spinning method such as a wet spinning method, a dry spinning method and a melt spinning method.

According to one embodiment, the nanoparticle dispersion solution can be subjected to wet spinning. Specifically, the nanoparticle dispersion solution (a solution obtained by dispersing the nanoparticles in a solution in which a material that will constitute the matrix is dissolved) is spun from a nozzle to form into a yarn shape, followed by solidifying to form a yarn in a solidifying liquid.

According to another embodiment, a solid mixture of the particles comprised of material that will constitute the matrix and the nanoparticles obtained by mechanical alloying can be subjected to dry spinning. Specifically, a viscous solution, which is prepared by dissolving the solid mixture in a solvent for a material comprising a matrix, is spun from a nozzle to form into a yarn shape and the solvent is evaporated by hot air and the like, followed by solidifying to form a yarn.

According to still another embodiment, a solid mixture of particles comprised of material that will constitute the matrix and the nanoparticles obtained by mechanical alloying can be subjected to melt spinning. Specifically, the solid mixture is melted and spun from a nozzle to form into a yarn shape and then cooled in the atmosphere or in a gas, followed by solidifying to form a yarn.

c. In the case of winding a fiber or a yarn comprised of a material in which a plurality of nanoparticles is dispersed in a matrix around a core yarn, the winding method is not particularly limited, for example, there may be employed a conventionally known method for producing a covered yarn.

The core yarn is not limited, for example, the core yarn exemplified in the description of method a. may be used. In addition, there is no limitation on the fiber or yarn comprised of a material in which a plurality of nanoparticles is dispersed in a matrix, for example, there may be used the yarn produced by the method exemplified in the description of method b.

Nanoparticles are eluted in a liquid which dissolves the nanoparticles but does not dissolve the matrix by immersing a yarn having a surface comprised of the material formed as above in which the nanoparticles are dispersed in the matrix or a three-dimensional product which is prepared by knitting (weaving) the yarn into a three-dimensional shape in the liquid.

There is no limitation on the liquid which dissolves the nanoparticles but does not dissolve the matrix, and appropriate one may be selected depending on the combination of the nanoparticles and the material constituting the matrix. For example, there may be used an acid solution such as hydrochloric acid, nitric acid and sulfuric acid; an alkali solution such as a sodium hydroxide aqueous solution and a potassium hydroxide aqueous solution; and an organic solvent.

The immersion time is not limited, and the immersion may be carried out for a sufficient period until the nanoparticles are eluted. During the immersion, supplementary processing may be carried out in order to accelerate the elution of the nanoparticles, for example, an ultrasonic wave is applied to a sample.

After the elution, washing with water is carried out if necessary and then dried, thereby providing a yarn or a three-dimensional product having a nanoporous surface.

There is no limitation on the method for knitting or weaving a yarn having a surface comprised of a material in which nanoparticles are dispersed in a nanoparticle matrix or a yarn having a nanoporous surface into a three-dimensional shape, and a conventionally known method can be employed.

In addition, the shape of the three-dimensional product is not limited. For example, a yarn can be formed into a complicated three-dimensional shape which imitates biological organs and tissues and the like such as organs and blood vessels or a shape of a cell culture vessel such as a petri dish and a multiwell plate.

Since a three-dimensional product having a nanoporous surface has an extremely large surface area, it can be used, for example, as an adsorbent, a separation film, a catalyst and a catalyst support. In addition, a three-dimensional product having a nanoporous surface can also be used as a cell culture scaffolding material.

What is claimed is:

1. A method for producing a three-dimensional product having a nanoporous surface, the method comprising:
   preparing a yarn having a surface consisting of a material in which a plurality of nanoparticles is dispersed in a matrix;
   knitting or weaving the yarn to form a knitted fabric or a woven fabric; and
   immersing the knitted fabric or the woven fabric in a liquid which dissolves the nanoparticles but does not dissolve the matrix.

2. The method for producing a three-dimensional product having a nanoporous surface according to claim 1, wherein the nanoparticles are metal particles.

3. The method for producing a three-dimensional product having a nanoporous surface according to claim 1, wherein the matrix comprises a polymer material.

4. The method for producing a three-dimensional product having a nanoporous surface according to claim 1, wherein the liquid which dissolves the nanoparticles but does not dissolve the matrix is an alkali solution or an acid solution.

5. The method for producing a three-dimensional product having a nanoporous surface according to claim 1, wherein the preparing of a yarn having a surface consisting of the material in which a plurality of nanoparticles is dispersed in a matrix comprises:
   preparing a core yarn;
   preparing a nanoparticle dispersion solution comprising a material that will constitute the matrix; and
   applying the nanoparticle dispersion solution on the core yarn.

6. The method for producing a three-dimensional product having a nanoporous surface according to claim 1, wherein the preparing of a yarn having a surface consisting of the material in which a plurality of nanoparticles is dispersed in a matrix comprises:
   preparing a solid mixture by mixing particles consisting of a material that will constitute the matrix with particles consisting of a material that will constitute the nanoparticles; and
   spinning the solid mixture.

7. A method for producing a three-dimensional product having a nanoporous surface, the method comprising:
   preparing a yarn having the nanoporous surface; and
   knitting or weaving the yarn having the nanoporous surface,
   wherein the preparing of the yarn having the nanoporous surface comprises:
      preparing a yarn having a surface consisting of a material in which a plurality of nanoparticles is dispersed in a matrix; and
      immersing the yarn in a liquid which dissolves the nanoparticles but does not dissolve the matrix so as to provide the yarn having the nanoporous surface.

8. The method for producing a three-dimensional product having a nanoporous surface according to claim 7, wherein the nanoparticles are metal particles.

9. The method for producing a three-dimensional product having a nanoporous surface according to claim 7, wherein the nanoparticles are Ag particles.

10. The method for producing a three-dimensional product having a nanoporous surface according to claim 7, wherein the matrix comprises a polymer material.

11. The method for producing a three-dimensional product having a nanoporous surface according to claim 7, wherein the liquid which dissolves the nanoparticles but does not dissolve the matrix is an alkali solution or an acid solution.

12. The method for producing a three-dimensional product having a nanoporous surface according to claim 7, wherein the preparing of the yarn having the surface consisting of the material in which the plurality of nanoparticles is dispersed in the matrix comprises:
   preparing a core yarn;
   preparing a nanoparticle dispersion solution comprising a material that will constitute the matrix; and
   applying the nanoparticle dispersion solution on the core yarn to form a coated layer.

13. The method for producing a three-dimensional product having a nanoporous surface according to claim 7, wherein the preparing of the yarn having the surface consisting of the material in which the plurality of nanoparticles is dispersed in the matrix comprises:
   preparing a solid mixture by mixing particles consisting of a material that will constitute the matrix with particles consisting of a material that will constitute the nanoparticles; and
   spinning the solid mixture.

14. The method for producing a three-dimensional product having a nanoporous surface according to claim 13, wherein the mixing is carried out by using a ball mill.

15. The method for producing a three-dimensional product having a nanoporous surface according to claim 7, further comprising:
   controlling a pore size or pore size distribution of the nanoporous surface by adjusting an amount, particle size, or particle size distribution of the nanoparticles dispersed in the matrix.

16. The method for producing a three-dimensional product having a nanoporous surface according to claim 7, further comprising:
   removing a core yarn from the yarn to form a hollow yarn.

17. The method for producing a three-dimensional product having a nanoporous surface according to claim 7, further comprising:
   modifying surfaces of the nanoparticles before dispersing the nanoparticles in the matrix.

18. A method for producing a three-dimensional product having a nanoporous surface, the method comprising:
   preparing a nanoparticle dispersion solution;
   applying the nanoparticle dispersion solution on the core yarn to form a coated layer comprising nanoparticles dispersed in a matrix;
   heating the coated layer so as to sinter or melt the coated layer into a continuous phase;
   immersing the yarn in a liquid which dissolves the nanoparticles but does not dissolve the matrix to form a yarn having a nanoporous surface; and
   knitting or weaving the yarn having the nanoporous surface.

19. A method for producing a three-dimensional product having a nanoporous surface, the method comprising:
   preparing a solid mixture by mixing particles consisting of a material that will constitute a matrix with particles consisting of a material that will constitute nanoparticles;
   melting the solid mixture or dissolving the solid mixture in a solvent to form a dispersion solution;
   applying the dispersion solution to a core yarn to form a yarn having a surface consisting of a material in which the nanoparticles are dispersed in the matrix;
   immersing the yarn in a liquid which dissolves the nanoparticles but does not dissolve the matrix to form a yarn having a nanoporous surface; and
   knitting or weaving the yarn having the nanoporous surface.

\* \* \* \* \*